United States Patent Office 3,503,763
Patented Mar. 31, 1970

3,503,763
CREPTALLIZABLE LEAD BOROSILICATE COMPOSITIONS FOR USE AS LOW THERMAL EXPANSION, DEVITRIFYING SOLDER GLASSES OR COATINGS
Walter H. Mills, Lancaster, Ohio, assignor to Anchor Hocking Glass Corporation, Lancaster, Ohio, a corporation of Delaware
No Drawing. Filed Dec. 6, 1966, Ser. No. 599,394
Int. Cl. C04b 35/14; C03c 3/08, 17/00
U.S. Cl. 106—53   6 Claims

ABSTRACT OF THE DISCLOSURE

Devitrifying glass compositions for use as solder glasses or coatings, including about 13–23 wt. percent PbO, 4–11% $B_2O_3$, 4–6% $Li_2O$, 14–19% $Al_2O_3$ and 39–50% $SiO_2$. A nucleating agent may also be included. When crystallized the compositions have coefficients of thermal expansion in the range of about $-5$ to $+30 \times 10^{-7}/°$ C., and contain lithia-alumina-silicate crystals (beta spodumene or beta-eucryptite) as the primary type, with no lead silicate or zinc silicate crystals present.

---

This invention is directed to novel compositions for use as solder glasses for bonding or sealing or as coatings for low expansion bodies. These compositions are devitrifiable to form semi-crystalline materials of low expansion which contain crystals of the beta-spodumene type and/or the beta-eucryptite type.

By the term "solder glass" is meant a material which can be used to join metals, semi-crystalline glasses or ceramic bodies in a manner generally similar to the soldering of metals. In such use, the devitrifying solder glasses of this invention are formed as glass and are then converted to partially crystalline (devitrified) ceramics by subsequent heat treatment. For use as a soldering medium, the glass may be cast into desired shapes such as washers, disks, and bars or used in powder form, dusted or mixed with a liquid and sprayed, brushed, or flowed on the bases to be joined, and in such use serves as the adhesive or binder. The term solder "glass" is used herein in reference to the compositions of this invention both before and after their crystallization.

By the term "low expansion coating" is meant a material which can be used as a glaze or coating on supporting bodies having coefficients of linear expansion of less than about $35 \times 10^{-7}/°$ C. For such use the devitrifiable compositions of this invention are usually powdered, mixed with a liquid medium and applied to the base composition by brushing, spraying or dipping. Thus, each of the compositions described hereafter can be used as either solder glasses or as coatings, and both terms are sometimes used in reference to the identical composition.

The coefficients of linear expansion of these compositions when in the glassy state are in the range of about 40 to $50 \times 10^{-7}/°$ C.; when the compositions have been devitrified, their coefficients of linear expansion are less than about $30 \times 10^{-7}/°$ C. Some of these compositions display essentially no dimensional change with temperature changes even of several hundred degrees centigrade, that is, in the crystallized state their coefficients of expansion are substantially zero. Moreover, these compositions have an ability to adhere or bond to the bases onto which they are applied, at temperatures normally encountered in processing semicrystalline or ceramic bodies. Because of this combination of properties, the present compositions are compatible with and are especially adapted for use in coating or joining objects having coefficients of expansion within the range of about $0-30 \times 10^{-7}/°$ C.

These compositions differ from the prior art lead containing devitrifying solder glasses (see H.E. Simpson, "The Value of Lead in Solder Glass," The Glass Industry, December 1964, pp. 675–8, and "Use of Lead in Solder Glasses," Lead in the Ceramic Industries, published by Lead Industries Assn., Inc., December, 1964, pp. 5–8), in having relatively low percentages of lead oxide, PbO, and higher percentages of silica, $SiO_2$. They also differ in that they usually contain no, or very low, proportions of zinc oxide, ZnO, and in that their lead oxide content and zinc oxide content (if any) do not enter into the crystal phase, in contrast to prior art devitrifying solder glasses in which the primary crystal phase has been a lead silicate or a zinc silicate.

In broad terms, the compositions I have discovered are based on the following essential components, calculated as the oxides on a weight percent basis as synthesized:

TABLE I

Essential components

| | Approximate weight percent |
|---|---|
| PbO | 13–23 |
| $B_2O_3$ | 4–11 |
| $Li_2O$ | 4–6 |
| $Al_2O_3$ | 14–19 |
| $SiO_2$ | 39–50 |

In addition to the foregoing components, 1–6% of $TiO_2$ and/or 1–3% of $ZrO_2$ can advantageously be added as a nucleating agent to initiate crystallization of beta-spodumene and/or beta-eucryptite type crystals in the glass. Where the $B_2O_3$ content is in the range of 4–6%, the composition should also include iron oxide in the amount of about 2–5%, which may be added as either FeO or $Fe_2O_3$, or both.

In these compositions the lithia, alumina, and silica constitute the major crystal-forming ingredients, but titania and/or zirconia, if present, may also precipitate as a crystalline phase or phases, as explained hereinafter. The proportions of the lithia, alumina, and silica should approximate 1:1:4 on a mole basis. The $B_2O_3$ and PbO, together with that proportion of the silica which does not enter into the devitrifying phase, are the primary constituents of the glassy matrix in which the crystals are formed. Iron oxide, when present, also aids in nucleation and can be used to replace some $B_2O_3$ because of its strong fluxing action. The specific nucleating agent is not especially critical, and other known crystal nucleating agents, for example chromia, can be used in place of some or all of the $TiO_2$ and/or $ZrO_2$.

I have also discovered that, peculiarly, use of the mineral spodumene in compounding the initial batch gives better results than if its component oxides are added in other forms. This mineral is preferably used to supply most or all of the lithia content of the batch. If the mineral petalite is used, it is necessary to add alumina and a lithium compound to approximate a 1:1:4 $Li_2O$-$Al_2O_3$-$SiO_2$ ratio, and the intimate molecular relationships of these constituents in the mineral spodumene are more difficult to achieve in such a batch mixture of oxides.

In addition to the foregoing essential components, which preferably constitute at least 95% of the entire formulation, the compositions may also include lesser amounts of CaO, MgO, BaO, ZnO, $Na_2O$, $K_2O$, $As_2O_3$, FeO, $Fe_2O_3$ or other common glass-making ingredients. Calcium oxide and magnesium oxide are useful in increasing the chemical stability of the matrix glass after crystallization, and are also believed to regulate the viscosity of the matrix glass and to help control the expansion of the crystallized product. When present, the calcium and magnesium oxides should preferably not total more than about 4% of the total composition. Barium oxide may be used as a flux, in partial replacement of the PbO, and if present, should preferably not exceed more than about 6% of the total composition because higher concentrations tend to retard devitrification. Zinc oxide may be used in amounts up to about 2%, to provide additional fluxing and to improve chemical durability. Sodium oxide and potassium oxide are normally present as trace components or impurities totalling not over about 1%, and tend to inhibit devitrification if present in higher concentrations. Arsenic oxide and $NaNO_3$ may be added as fining agents. Table II following illustrates several specific compositions according to this invention, calculated as the oxides on a weight percentage basis from the batch.

lizable base during the cycle for ceraming or crystallizing the base. In contrast, coatings of the present compositions can be applied to devitrifiable objects and the objects crystallized to low expansion in accordance with their regular crystallizing cycles. The coating first softens and then crystallizes on the object as the latter crystallizes; by initially selecting a coating composition within the proportions described and having a coefficient of expansion when crystallized which will match that of the crystallized vessel, strain at the bonding interface after crystallization of the base should be almost entirely removed.

Following are several examples of typical crystallization cycles;

(1) In separate tests, a coating of each of the com-

TABLE II.—BATCH COMPOSITIONS

| Composition No. | B-1 | A-7 | A-24 | A-14 | A-15 | A-50 | A-51 | A-9 | A-8 | A-1 | B | A-27 |
|---|---|---|---|---|---|---|---|---|---|---|---|---|
| Oxide, wt. percent: | | | | | | | | | | | | |
| $PbO$ | 13.5 | 15.2 | 19.2 | 20.2 | 20.2 | 20.3 | 20.3 | 20.8 | 20.9 | 21.3 | 21.3 | 22.2 |
| $B_2O_3$ | 6.5 | 9.5 | 9.0 | 7.1 | 4.7 | 9.4 | 9.9 | 9.7 | 9.7 | 9.2 | 10.4 | 9.5 |
| $Li_2O$ | 5.4 | 4.5 | 4.3 | 4.5 | 4.5 | 4.5 | 4.4 | 4.6 | 4.7 | 4.4 | 4.6 | 4.6 |
| $Al_2O_3$ | 18.6 | 15.7 | 14.9 | 15.7 | 15.7 | 15.7 | 15.0 | 16.1 | 16.1 | 15.2 | 15.8 | 15.9 |
| $SiO_2$ | 49.3 | 41.6 | 44.4 | 41.5 | 41.5 | 41.2 | 40.0 | 42.2 | 41.7 | 41.4 | 42.1 | 42.6 |
| $TiO_2$ | 3.0 | 2.6 | 2.4 | 2.6 | 2.6 | 3.8 | 5.9 | 1.3 | 2.6 | 2.5 | 2.6 | |
| $ZrO_2$ | 2.4 | 2.0 | 1.9 | 2.0 | 2.0 | 1.0 | 2.0 | 1.0 | | 2.0 | 2.1 | 1.0 |
| $FeO+Fe_2O_3$ | 0.4 | 0.3 | 0.3 | 2.7 | 5.0 | 0.3 | 0.3 | 0.3 | 0.3 | 0.3 | 0.3 | 0.3 |
| $CaO$ | 0.1 | 1.8 | 1.7 | 1.8 | 1.8 | 1.8 | | 1.9 | 1.9 | 1.8 | 0.1 | 1.9 |
| $MgO$ | | 1.2 | 1.2 | 1.2 | 1.3 | 1.2 | | 1.3 | 1.3 | 1.2 | | 1.3 |
| $BaO$ | | 5.0 | | | | | | | | | | |
| $ZnO$ | | | | | | | 1.9 | | | | | |
| $Na_2O$ | 0.4 | 0.2 | 0.3 | 0.3 | 0.3 | 0.4 | 0.1 | 0.4 | 0.4 | 0.3 | 0.3 | 0.3 |
| $K_2O$ | 0.2 | 0.2 | 0.2 | 0.2 | 0.2 | 0.2 | 0.2 | 0.2 | 0.2 | 0.2 | 0.2 | 0.2 |
| $As_2O_3$ | 0.2 | 0.2 | 0.2 | 0.2 | 0.2 | 0.2 | | 0.2 | 0.2 | 0.2 | 0.2 | 0.2 |

These glasses can be melted, preferably under oxidizing conditions, at temperatures in the range of about 1250 to 1450° C., melting at about 1370° C. for one hour being suitable in most cases. The melts can be fritted by quenching or pouring the molten glass into cold water to facilitate particle size reduction, and the fritted glasses may then be ground until reduced to powder fine enough to pass a 250 mesh screen or such other size as may be desired. Alternatively, where a large body of the composition is desired, for example in certain sealing applications, the glass can be cast into desired form, as previously described.

When powdered, the compositions of this invention can be used as glazes or enamels. For such use they may be applied as a slip or bisque coating in the manner of conventional enamels and glazes, for example by suspending in an alcohol-water mixture and spraying onto the base.

For a typical spray application, 100 grams of the frit is mixed with 175 milliliters of spray medium consisting of 3 parts water to 1 part by volume of alcohol.

Bonding to the base and crystallization of either the powdered or the cast glassy composition may be carried out during the same reheating operation, by reheating preferably to a temperature in the range of about 700 to 1050° C. for a period sufficiently long to effect the desired devitrification. At temperatures below about 700° C. the glasses usually do not soften sufficiently to adhere strongly to the base. The porosity of the coating decreases with increased temperature, but above 1050° C. the remaining glassy matrix tends to become excessively fluid and the crystals may be taken into solution.

By reason of their high thermal expansions, conventional glasses cannot be bonded to objects of such low thermal expansion without producing a highly strained condition at room temperature at the interface between the coating and the base. Moreover, many previously known low expansion glass-ceramic compositions have not been able to be well bonded to the surface of a crystalpositions of Table II was applied to "green" (uncrystallized) devitrifiable glass vessels having a coefficient of expansion of about $45 \times 10^{-7}$/° C. in the glassy state. These vessels, with the bisque coating applied were crystallized to an expansion of $13 \times 10^{-7}$/° C. by a cycle comprising heating from room temperature to 650° C. @ 170° C. per hour, heating more slowly from 650° C. @ 56° C. per hour to a hold at 955° C. for one hour, and cooling at about 170° C./hour. During this cycle both the vessel itself and the frit became partially crystallized, and the frit formed a tightly bonded surface on the vessel.

In separate tests, bars cast of each of the compositions of Table II were crystallized according to the heating schedule given above. The coefficients of expansion of the semicrystalline products were measured, and the crystal phases present were identified by X-ray diffraction. The results of these studies are given in Table III.

TABLE III.—CRYSTAL PHASES AND EXPANSIONS OF TABLE II COMPOSITIONS

| Composition | B-1 | A-7 | A-24 | A-14 | A-15 | A-50 | A-51 | A-9 | A-8 | A-1 | B | A-27 |
|---|---|---|---|---|---|---|---|---|---|---|---|---|
| Primary crystal type | B. spod. | B. eucr. | B. spod. | B. eucr. | B. eucr. | B. spod. | B. eucr. | B. spod. | B. spod. | B. spod. | B. spod. | B. spod. |
| Secondary crystal type | | B. spod. | | | | | | | B. eucr. | | | |
| Expansion, $\times 10^{-7}$/° C.: | | | | | | | | | | | | |
| 38–93° C | 2.0 | 1.2 | 6.4 | 16.3 | 14.6 | 8.8 | 13.3 | 13.0 | 0.0 | 5.6 | 2.3 | 22.9 |
| 38–177° C | 2.5 | 7.1 | 6.6 | 17.0 | 16.2 | 10.5 | 14.8 | 14.9 | 1.5 | 7.8 | −0.9 | 23.5 |
| 38–288° C | 4.6 | 11.9 | 7.2 | 18.4 | 17.9 | 12.8 | 16.9 | 16.5 | 3.7 | 10.0 | −0.3 | 25.5 |

It can be seen from this table that in each instance crystals of either the beta-spodumene type or the beta-eucryptite type, or both, were formed, and that the expansions of all of the crystallized compositions were in the range of about $-5$ to $+30 \times 10^{-7}$/° C. X-ray examinations have not revealed the presence of lead oxide, boric oxide, calcium oxide, magnesium oxide, or zinc oxide in any crystalline phase. In some instances, a rutile and/or zirconium titanate crystal phase can be detected in addition to the lithia-alumina-silica crystal phase or phases.

(2) A devitrifiable green glass, having a coefficient of expansion of $13 \times 10^{-7}$/° C. when crystallized, was ground to pass a 16 mesh screen and be retained on a 20 mesh screen (U.S. Sieve Size). In separate tests, portions of this ground material were intimately mixed with 1–5% of compositions A–9, A–50 and B, ground to pass 250 mesh screen. This mixture was then wetted with water. Each of the resulting mixtures was packed into a mold of desired shape and heated therein at a rate of about 500° C. per hour to a temperature of about 760° C. and held there for one hour. The temperature was then raised to 1040° C. over a period of 1½ hours and held at about 1040° C. for 3 hours. This effected crystallization of both the green glass particles and the powder. The powder acted as a solder glass in bonding the article into a porous well bonded body.

(3) A coating of composition A–50 was applied to a previously crystallized base of the type described in Example 1, and the object was placed in a furnace at 93° C. and heated to about 704° C. at a rate of 220–280° C./hr. The object was held for a period of ¾ hour at about 700° C. then cooled in air. The coating adhered uniformly to the base and was partially crystallized.

(4) Composition A–51 was used to bond ribs or strips of a crystallized glass-ceramic of the type described in Example 1, to the bottom of a cooking vessel of the same crystallized glass-ceramic. Before firing, the composition was "struck," that is, it was pretreated to increase its tendency to crystallize upon firing. This was done by placing the powdered composition in a crucible and heating at a rate of about 175° C. per hour to about 649° C., holding at about that temperature for one hour, and then cooling in the atmosphere. During this treatment the glass softens, and the particles adhere and turn black in color. This "striking" is believed to effect partial precipitation of the $TiO_2$, as indicated by the presence of brookite (a crystalline form of $TiO_2$) and eucryptite, and thereby facilitate its nucleating action. Such pretreatment is optional, but is useful to increase the tendency of the glass to crystallize particularly in a relatively low temperature cycle, e.g. at firing temperatures of about 700–900° C.

After striking, the solder glass was crushed, finely milled, and applied as a wetted powder to the ribs to be bonded. The ribs were positioned on the vessel, and the assembly was subjected to the firing cycle described in Example 3. This cycle was effective to solder the ribs securely to the vessel.

(5) Small cast disks of composition A–51 were struck by placing them in an annealing oven at temperatures of 593 to 649° C. for periods of fifteen minutes to one hour. The furnace was then shut off and allowed to cool at its inherent rate, approximately 222° C./hr., to room temperature. Upon removal from the furnace, the disks had turned black, indicating that nucleation had probably occurred. The struck disks can be used to bond previously crystallized glass-ceramic bodies having a compatible coefficient of expansion, for example by placing the disk in contact with and between the two glass-ceramic bodies and firing at the cycle described in Example 3.

From the foregoing it can be seen that the crystallizing schedule is not critical but follows well established methods, although different schedules will give somewhat varying results in terms of surface smoothness, porosity, extent of crystallization, and so on.

It is characteristic that the primary crystalline phase or phases of these compositions are in the lithia-alumina-silica system, and constitute either crystals of the beta-eucryptite type (generally grouped as $Li_2O \cdot Al_2O_3 \cdot 2SiO_2$) or the beta-spodumene type (generally grouped as;

$$Li_2O \cdot Al_2O_3 \cdot nSiO_2$$

wherein $n$ is 4–8). In the absence of excess amounts of devitrification-retarding components such as $Na_2O$, $K_2O$, and $BaO$, the basic compositions usually tend to crystallize readily, and in some instances they will crystallize in the absence of an added nucleating agent. However, I prefer to include either $TiO_2$ or $ZrO_2$ or both because they tend to effect more rapid and uniform crystallization.

In addition to the uses specified, these compositions can also be used to provide a rough intermediate bonding layer on a low expansion base, to improve the adherence of organic coatings such as "Teflon."

Having described my invention, what I claim is:

1. A solder glass composition that is compatible with materials having expansion coefficients in the range of from $-5$ to $+30 \times 10^{-7}/°$ C., is capable of being thermally devitrified within a period of up to three hours at a temperature in the range of 700 to 1050° C. to produce as the principal crystalline phase, crystals of a member of the class consisting of the beta-eucryptite type and the beta-spodumene type without the formation of appreciable amounts of crystals of the class consisting of zinc silicate and lead silicate, and consists essentially of

|  | Percent, about |
|---|---|
| PbO | 13–23 |
| $B_2O_3$ | 4–11 |
| $Li_2O$ | 4–6 |
| $Al_2O_3$ | 14–19 |
| $SiO_2$ | 39–50 | and at least one member of the class consisting of about 1–6% $TiO_2$ and about 1–3% $ZrO_2$, said composition also including about 2–5% iron oxide when the proportion of $B_2O_3$ is 4–6%.

2. The glass composition of claim 1 wherein said $B_2O_3$ is in the range of 6–11%.

3. The glass composition of claim 2 wherein there is included 1–3% of $TiO_2$ and 1–3% of $ZrO_2$.

4. The glass composition of claim 1 wherein said PbO is present in the amount of 19–23%, said $B_2O_3$ is present in the amount of 9–11%, and said $SiO_2$ is present in the amount of 40–44%.

5. The glass composition of claim 4 wherein substantially all of said $Li_2O$ and $Al_2O_3$ are added as spodumene mineral.

6. The composition of claim 1 wherein said PbO, $B_2O_3$, $Li_2O$, $Al_2O_3$, and $SiO_2$, consists of at least 95% of the total.

References Cited

UNITED STATES PATENTS

| 2,756,158 | 7/1956 | Hahn et al. | 106—50 |
| 2,956,219 | 10/1960 | Cianchi | 106—53 |
| 3,088,834 | 5/1963 | Pirooz | 106—53 |
| 3,252,811 | 5/1966 | Beall | 106—39 |
| 3,328,145 | 6/1967 | McMillan et al. | 106—39 X |
| 3,384,508 | 5/1968 | Bopp et al. | 106—39 X |

OTHER REFERENCES

Materials for Ceramic Processing in Ceramic Industry, 84, Chicago (Cahners Publ.), January 1965, pp. 105 and 147.

HELEN M. McCARTHY, Primary Examiner

W. R. SATTERFIELD, Assistant Examiner

U.S. Cl. X.R.

65—33; 106—39; 117—125

UNITED STATES PATENT OFFICE
CERTIFICATE OF CORRECTION

Patent No. 3,503,763          Dated March 31, 1970

Inventor(s) Walter H. Mills

It is certified that error appears in the above-identified patent and that said Letters Patent are hereby corrected as shown below:

First word in title, "Creptallizable" should be --Crystallizable--

Column 1, line 36, "glass" should be --glasses--

Column 5, line 27, "thereby facilitate" should be --thereby to facilitate--

SIGNED AND
SEALED
AUG 11 1970

(SEAL)
Attest:

Edward M. Fletcher, Jr.
Attesting Officer

WILLIAM E. SCHUYLER, JR.
Commissioner of Patents